UNITED STATES PATENT OFFICE.

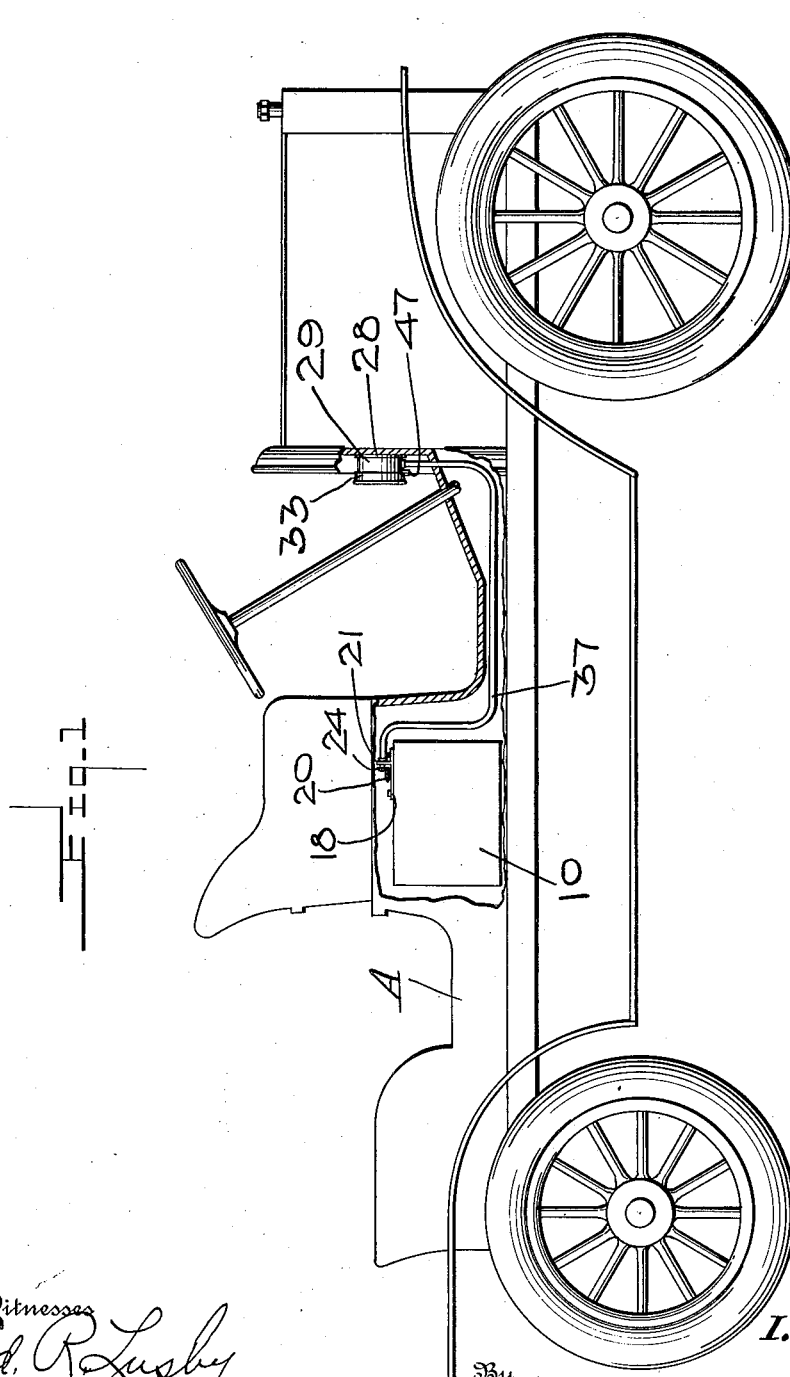

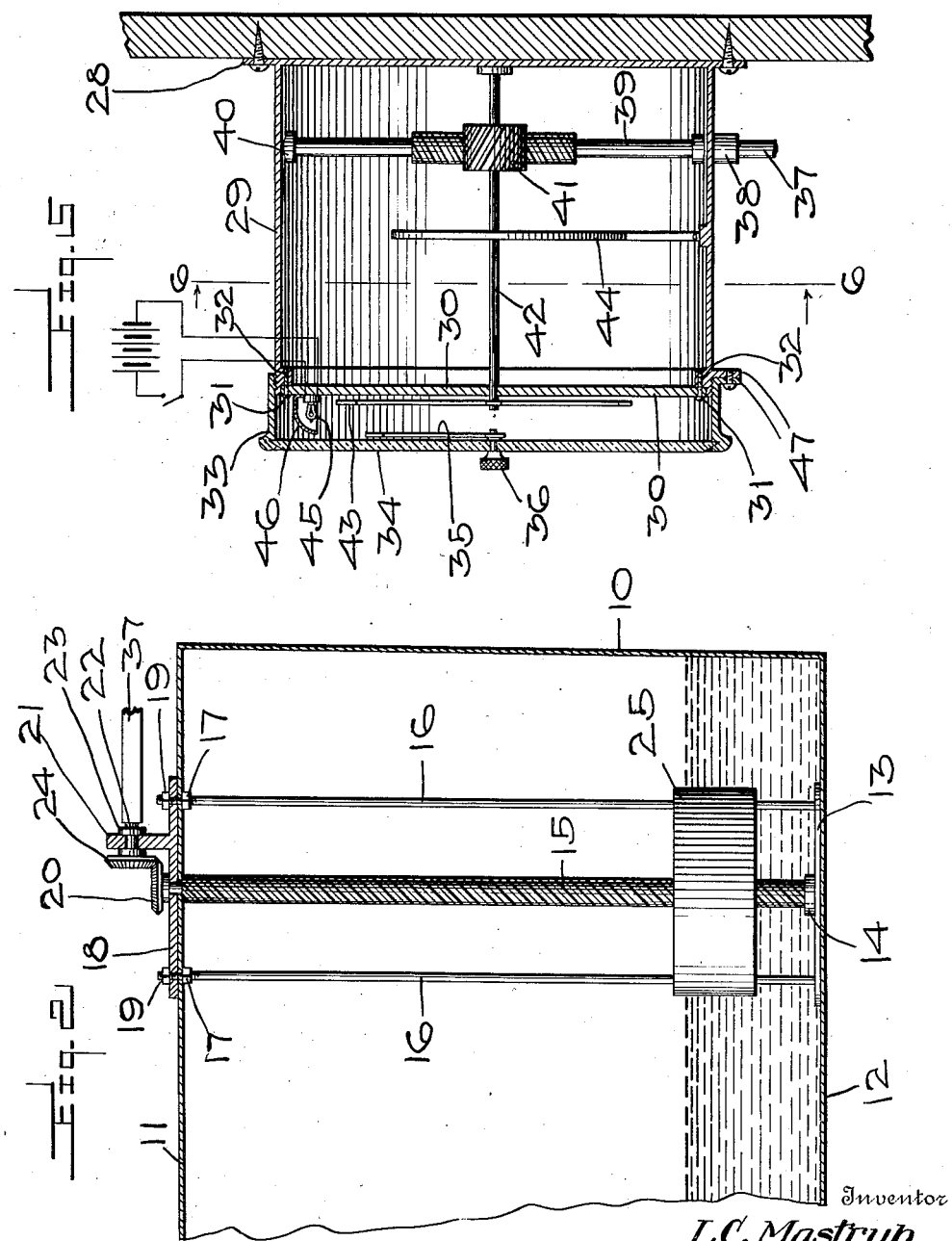

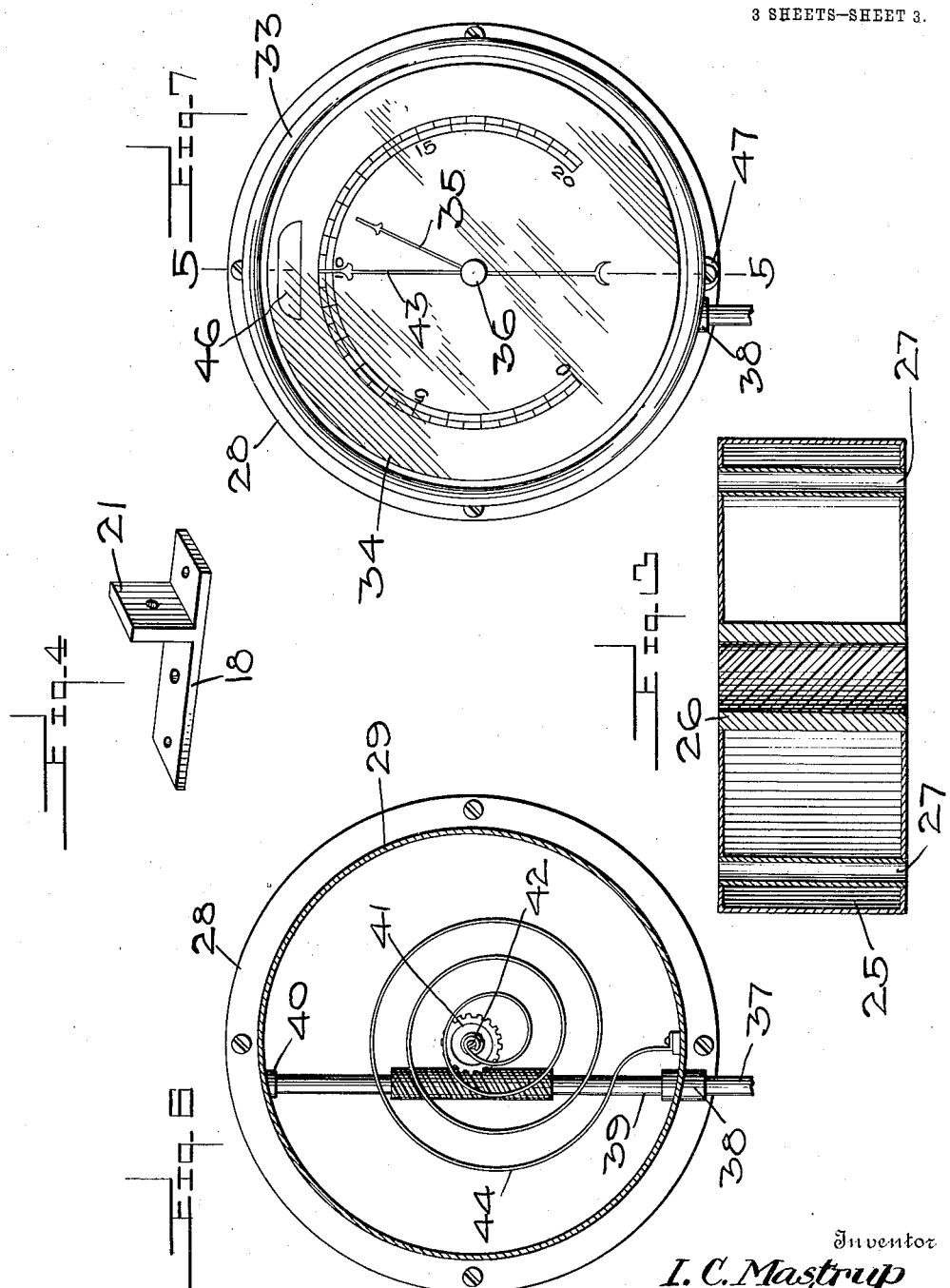

IVER C. MASTRUP, OF SAN RAFAEL, CALIFORNIA.

LIQUID-MEASURE INDICATOR.

992,370. Specification of Letters Patent. Patented May 16, 1911.

Application filed June 21, 1910. Serial No. 568,206.

*To all whom it may concern:*

Be it known that I, IVER C. MASTRUP, a citizen of the United States, residing at San Rafael, in the county of Marin and State of California, have invented certain new and useful Improvements in Liquid-Measure Indicators, of which the following is a specification.

This invention relates to liquid measure indicators and more particularly to an indicator of this character which is especially adapted for application to a gasolene supply tank of an automobile and adapted to indicate the depth of the gasolene therein and to indicate the amount of gasolene used for traveling a certain distance.

An object of the invention is to provide a simple and efficient structure of this character which will accurately indicate the height of the gasolene in the tank to the smallest degree and in which the transmission of such indications will be made with but small friction.

Other objects and advantages will be apparent from the following description, and it will be understood that changes in the specific structure shown and described may be made within the scope of the claims without departing from the spirit of the invention.

In the drawings: Figure 1 is a side elevation of an automobile partly in section and showing my invention applied thereto, Fig. 2 is an enlarged sectional view of a portion of a tank with the operating mechanism for the indicator applied thereto, Fig. 3 is a detail sectional view of a float adapted to actuate the operating shaft, Fig. 4 is a detail perspective view of a bearing bracket for the operating mechanism, Fig. 5 is a detail sectional view of the indicator on the line 5—5 of Fig. 7, Fig. 6 is a cross sectional view on the line 6—6 of Fig. 5, Fig. 7 is a front elevation of the indicator.

Referring to the drawings in detail, A indicates an automobile body to which I have shown my invention as applied for purposes of illustration but which forms no particular feature of my invention, as the indicator may be applied to any vehicle wherein gasolene is used for fuel, such for instance as oil burning steam vessels. The body of the automobile carries a gasolene tank 10 under the seat thereof and which may be of rectangular shape having top and bottom walls 11 and 12 respectively, to the bottom wall of which a base plate 13 is secured, said plate having a central raised bearing 14 in which a vertical worm shaft 15 is rotatably mounted, and said shaft is provided with reduced ends, the lowermost of which is fitted within the bearing 14 and the surrounding shoulder formed thereby rotatably supported on said bearing.

A pair of guiderods 16 is disposed in recesses in the base plate 13 and these rods are extended vertically and equidistant from the worm shaft 15, the upper ends of said rods being threaded and disposed through the top wall of the tank, where they are held against accidental vertical movement by securing nuts 17 disposed in engagement with the under face of the top wall. A bearing bracket 18 is supported upon the top wall 11 and is provided with apertures therethrough adapted to receive the upper ends of the rods 16 which are held in position by securing nuts 19, so that said bracket may be secured at different heights on the rods to fit different sized tanks. The upper end of the worm shaft is disposed through the top wall of the tank and the bearing bracket 18 and has a beveled gear 20 rigidly mounted thereon. The bearing bracket 18 is provided with a vertical extension 21 upon which a stub shaft 22 is rotatably mounted against longitudinal movement as by means of a bearing collar 23 and said shaft has a beveled gear 24 rigidly mounted upon its inner end and adapted to mesh with the beveled gear 20.

A cylindrical float 25 preferably constructed of copper is provided with a central screw threaded bushing 26 extending therethrough and adapted for engagement with the worm shaft 15, said float being also provided with diametrically opposite tubes 27 disposed therethrough and adapted for sliding movement over the rods 16, so that as the height of the gasolene within the tank rises or falls, the float will be moved vertically and the worm shaft rotated to operate the indicator mechanism to be hereinafter more fully described. It will also be apparent that the float can move vertically upon the rods but will be held from rotation thereby.

In order to indicate the various changes in the height of the gasolene within the tank through the operation of the float and worm shaft heretofore described I provide a novel form of indicator which comprises a circular back plate 28 which is secured to the dashboard of the vehicle and in position to be seen by the operator. The back plate 28 is provided with an annular extension or shell 29 near the outer edge of which is securely fastened an indicator dial plate 30, said plate being secured to the annular extension by means of screws 31 engaged within the apertured lugs 32 carried by the extension and as will be noted in Fig. 7 of the drawings, the dial plate is graduated to indicate the capacity of the tank in gallons or half gallons or otherwise if desired, so that the capacity of the tank or the amount of gasolene therein may be readily ascertained. An annular sleeve 33 is threaded upon the outer end of the shell and carries a glass cover 34 upon which a movable pointer 35 is rotatably mounted as by means of a central pin 36 also serving to move the pointer for a purpose to be presently described. The glass cover is secured to said sleeve by rolling over the edge of the sleeve and confining the beveled edge of the glass therein.

Operatively connected with the stub shaft 22 by means of an intermediate flexible shaft 37 which is disposed through a bearing sleeve 38 carried by the shell 29 is a worm shaft 39 which is rotatably journaled at its opposite end in an extension 40 also formed integral with the shell. The worm portion of the shaft 39 is located centrally thereon and is adapted to mesh with and actuate a worm pinion 41 rigidly carried upon a central shaft 42 properly journaled in the back plate 28 and the dial plate 30, said shaft having an indicating arrow 43 mounted on its outer end which extends through the dial plate 30. By moving the pointer 35 to indicate the amount of fuel in the tank as indicated by the arrow 43 before a run, it may be readily ascertained by the difference between the amounts indicated by the pointer and arrow, as to the number of miles covered on a given amount of fuel.

A spiral spring 44 is secured to the shaft 42 and anchored at the opposite end to the shell 29 so as to take up lost motion and to prevent vibration of the pointer, due to the travel of the vehicle over uneven surfaces. The indicator is also provided with a miniature electric lamp 45 and a reflector 46, both of which are carried by the dial plate 30, said lamp being connected in circuit in the usual manner so that the height of the gasolene in the tank may be readily ascertained at night. To prevent accidental removal of the sleeve 33 I provide the sleeve and shell with apertured lugs 47 which may be secured together in any desirable manner so that tampering with the device will also be prevented.

While I have shown my improved indicator as applied to an automobile it is obvious that it may be applied for use upon steam vessels and in view of its extreme simplicity of construction, the transmission of the various positions of the float to the indicating arrow will be extremely accurate.

What is claimed is:

1. An indicating device of the class described comprising the combination with a tank; of a base plate carried by the bottom of the tank, a worm shaft extended vertically through the top of the tank, said shaft being revolubly mounted upon said plate, a bearing bracket, having an apertured portion, resting upon the top of the tank, rods secured the base plate and extended vertically at spaced distances upon diametrically opposite sides of the worm shaft, the upper ends of said rods being threaded and disposed through the top of the tank and the bearing bracket, securing nuts disposed on said rods beneath the top of the tank and upon the bearing bracket, an indicator having means operatively connected with said worm shaft and a float having a central screw threaded portion engaged with said worm shaft and slidably mounted upon said rods to rotate the shaft and operate the indicator.

2. In an indicating device of the class described, the combination with a tank casing provided with a worm shaft and a float mounted thereon, an indicator device comprising a casing having graduations thereon, a worm shaft journaled in the casing, a second shaft rotatably mounted in the casing at right angles to the worm shaft therein, a pinion carried by the second named shaft in mesh with said worm shaft, an indicating arrow carried upon the outer end of the second shaft and adapted to coact with said graduations, a movable pointer carried by the casing and a flexible shaft connecting the first and second named worm shafts.

3. An indicating device comprising a worm shaft, means for rotating the shaft according to the variations in heights of a liquid within a receptacle and an indicator operated thereby, said indicator comprising a casing, a sleeve disposed through said casing, a worm shaft rotatably mounted in the casing and extending through the sleeve, operative connections between the first named means and the worm shaft, a second shaft, a face plate for the casing having a dial thereon, said second shaft being revolubly mounted in the casing at right angles to the worm shaft, a pinion carried by the second shaft in the casing and engageably in mesh with said worm shaft, said second shaft extending through the face plate, an arrow mounted thereon for indicating the height of said liquid and a cover detachably secured to the casing.

In testimony whereof I affix my signature, in presence of two witnesses.

IVER C. MASTRUP.

Witnesses:
 JOE BERELLA,
 CARL SIRARD.